(12) United States Patent
Karabinis et al.

(10) Patent No.: US 8,265,549 B2
(45) Date of Patent: Sep. 11, 2012

(54) SATELLITE COMMUNICATIONS SYSTEMS AND METHODS USING RADIOTELEPHONE

(75) Inventors: Peter D. Karabinis, Cary, NC (US); Santanu Dutta, Cary, NC (US); Gary G. Churan, Annandale, VA (US)

(73) Assignee: ATC Technologies, LLC, Reston, VA (US)

( * ) Notice: Subject to any disclaimer, the term of this patent is extended or adjusted under 35 U.S.C. 154(b) by 1693 days.

(21) Appl. No.: 11/126,799

(22) Filed: May 11, 2005

(65) Prior Publication Data

US 2005/0260947 A1    Nov. 24, 2005

Related U.S. Application Data

(60) Provisional application No. 60/572,164, filed on May 18, 2004.

(51) Int. Cl.
*H04B 7/185* (2006.01)
(52) U.S. Cl. .................. 455/12.1; 370/316; 342/357.23
(58) Field of Classification Search ............ 455/12.1, 455/13.3, 427, 429, 430, 431; 370/316–321; 342/357.22–357.25, 357.31, 357.39, 357.48; 244/172.5
See application file for complete search history.

(56) References Cited

U.S. PATENT DOCUMENTS

| | | | |
|---|---|---|---|
| 4,901,307 A | 2/1990 | Gilhousen et al. | |
| 5,073,900 A | 12/1991 | Mallinckrodt | |
| 5,303,286 A | 4/1994 | Wiedeman | |
| 5,339,330 A | 8/1994 | Mallinckrodt | |
| 5,394,561 A | 2/1995 | Freeburg | |
| 5,446,756 A | 8/1995 | Mallinckrodt | |
| 5,448,623 A | 9/1995 | Wiedeman et al. | |
| 5,511,233 A | 4/1996 | Otten | |
| 5,555,257 A | 9/1996 | Dent | |
| 5,584,046 A | 12/1996 | Martinez et al. | |
| 5,612,703 A | 3/1997 | Mallinckrodt | |
| 5,619,525 A | 4/1997 | Wiedeman et al. | |
| 5,631,898 A | 5/1997 | Dent | |
| 5,722,049 A | 2/1998 | Hassan et al. | |
| 5,761,605 A | 6/1998 | Tawil et al. | |
| 5,765,098 A | 6/1998 | Bella | |

(Continued)

FOREIGN PATENT DOCUMENTS

EP    0 506 255 A2    9/1992

(Continued)

OTHER PUBLICATIONS

Invitation to Pay Additional Fees and Partial International Search Report for PCT/US2005/017297 mailed on Sep. 27, 2005.

(Continued)

*Primary Examiner* — Nay A Maung
*Assistant Examiner* — Angelica Perez
(74) *Attorney, Agent, or Firm* — Myers Bigel Sibley & Sajovec, P.A.

(57) ABSTRACT

A processor for use in a satellite communications system includes a selector that is configured to select a subset of a plurality of spatially diverse satellite signals based upon a location of a radioterminal. The processor further includes a signal processor that is configured to detect a return-link transmission from the radioterminal responsive to the selected subset of the spatially diverse satellite signals. The respective spatially diverse satellite signals may include respective signals corresponding to respective antenna elements of a satellite. The selector and the signal processor may be ground based.

26 Claims, 7 Drawing Sheets

U.S. PATENT DOCUMENTS

| | | | |
|---|---|---|---|
| 5,812,947 A | 9/1998 | Dent | |
| 5,832,379 A | 11/1998 | Mallinckrodt | |
| 5,835,857 A | 11/1998 | Otten | |
| 5,848,060 A | 12/1998 | Dent | |
| 5,852,721 A | 12/1998 | Dillon et al. | |
| 5,878,329 A | 3/1999 | Mallinckrodt | |
| 5,884,142 A | 3/1999 | Wiedeman et al. | |
| 5,907,541 A | 5/1999 | Fairholm et al. | |
| 5,926,758 A | 7/1999 | Grybos et al. | |
| 5,937,332 A | 8/1999 | Karabinis | |
| 5,940,753 A | 8/1999 | Mallinckrodt | |
| 5,991,345 A | 11/1999 | Ramasastry | |
| 5,995,832 A | 11/1999 | Mallinckrodt | |
| 6,011,951 A | 1/2000 | King et al. | |
| 6,023,605 A | 2/2000 | Sasaki et al. | |
| 6,052,560 A | 4/2000 | Karabinis | |
| 6,052,586 A | 4/2000 | Karabinis | |
| 6,067,442 A | 5/2000 | Wiedeman et al. | |
| 6,072,430 A | 6/2000 | Wyrwas et al. | |
| 6,085,094 A | 7/2000 | Vasudevan et al. | |
| 6,091,933 A | 7/2000 | Sherman et al. | |
| 6,097,752 A | 8/2000 | Wiedeman et al. | |
| 6,101,385 A | 8/2000 | Monte et al. | |
| 6,108,561 A | 8/2000 | Mallinckrodt | |
| 6,134,437 A | 10/2000 | Karabinis et al. | |
| 6,157,811 A | 12/2000 | Dent | |
| 6,157,834 A | 12/2000 | Helm et al. | |
| 6,160,994 A | 12/2000 | Wiedeman | |
| 6,169,878 B1 | 1/2001 | Tawil et al. | |
| 6,198,730 B1 | 3/2001 | Hogberg et al. | |
| 6,198,921 B1 | 3/2001 | Youssefzadeh et al. | |
| 6,201,967 B1 | 3/2001 | Goerke | |
| 6,233,463 B1 | 5/2001 | Wiedeman et al. | |
| 6,240,124 B1 | 5/2001 | Wiedeman et al. | |
| 6,253,080 B1 | 6/2001 | Wiedeman et al. | |
| 6,256,497 B1 | 7/2001 | Chambers | |
| 6,317,420 B1 | 11/2001 | Schiff | |
| 6,324,405 B1 | 11/2001 | Young et al. | |
| 6,339,707 B1 | 1/2002 | Wainfan et al. | |
| 6,418,147 B1 | 7/2002 | Wiedeman | |
| 6,449,461 B1 | 9/2002 | Otten | |
| 6,522,864 B1 * | 2/2003 | Febvre et al. | 455/12.1 |
| 6,522,865 B1 | 2/2003 | Otten | |
| 6,628,919 B1 | 9/2003 | Curello et al. | |
| 6,684,057 B2 | 1/2004 | Karabinis | |
| 6,735,437 B2 | 5/2004 | Mayfield et al. | |
| 6,775,251 B1 | 8/2004 | Wiedeman | |
| 6,785,543 B2 | 8/2004 | Karabinis | |
| 6,845,124 B2 | 1/2005 | Mattos et al. | |
| 6,856,787 B2 | 2/2005 | Karabinis | |
| 6,859,652 B2 | 2/2005 | Karabinis et al. | |
| 6,879,829 B2 | 4/2005 | Dutta et al. | |
| 6,892,068 B2 | 5/2005 | Karabinis et al. | |
| 6,937,857 B2 | 8/2005 | Karabinis | |
| 6,975,837 B1 | 12/2005 | Santoru | |
| 6,999,720 B2 | 2/2006 | Karabinis | |
| 7,006,789 B2 | 2/2006 | Karabinis et al. | |
| 7,702,002 B2 * | 4/2010 | Krasner | 375/150 |
| 2001/0031647 A1 | 10/2001 | Scherzer et al. | |
| 2002/0122408 A1 | 9/2002 | Mullins | |
| 2002/0146979 A1 | 10/2002 | Regulinski et al. | |
| 2002/0177465 A1 | 11/2002 | Robinett | |
| 2003/0003815 A1 | 1/2003 | Yamada | |
| 2003/0022625 A1 | 1/2003 | Otten et al. | |
| 2003/0054762 A1 | 3/2003 | Karabinis | |
| 2003/0054814 A1 | 3/2003 | Karabinis et al. | |
| 2003/0054815 A1 | 3/2003 | Karabinis | |
| 2003/0068978 A1 | 4/2003 | Karabinis et al. | |
| 2003/0073436 A1 | 4/2003 | Karabinis et al. | |
| 2003/0149986 A1 | 8/2003 | Mayfield et al. | |
| 2003/0153308 A1 | 8/2003 | Karabinis | |
| 2004/0072539 A1 | 4/2004 | Monte et al. | |
| 2004/0102156 A1 | 5/2004 | Loner | |
| 2004/0121727 A1 | 6/2004 | Karabinis | |
| 2004/0142660 A1 | 7/2004 | Churan | |
| 2004/0192200 A1 | 9/2004 | Karabinis | |
| 2004/0192293 A1 | 9/2004 | Karabinis | |
| 2004/0192395 A1 | 9/2004 | Karabinis | |
| 2004/0203393 A1 | 10/2004 | Chen | |
| 2004/0203742 A1 | 10/2004 | Karabinis | |
| 2004/0240525 A1 | 12/2004 | Karabinis et al. | |
| 2005/0026606 A1 | 2/2005 | Karabinis | |
| 2005/0037749 A1 | 2/2005 | Karabinis et al. | |
| 2005/0041619 A1 | 2/2005 | Karabinis et al. | |
| 2005/0064813 A1 | 3/2005 | Karabinis | |
| 2005/0079816 A1 | 4/2005 | Singh et al. | |
| 2005/0090256 A1 | 4/2005 | Dutta | |
| 2005/0118948 A1 | 6/2005 | Karabinis et al. | |
| 2005/0136836 A1 | 6/2005 | Karabinis et al. | |
| 2005/0164700 A1 | 7/2005 | Karabinis | |
| 2005/0164701 A1 | 7/2005 | Karabinis et al. | |
| 2005/0170834 A1 | 8/2005 | Dutta et al. | |
| 2005/0181786 A1 | 8/2005 | Karabinis et al. | |
| 2005/0201449 A1 | 9/2005 | Churan | |
| 2005/0208890 A1 | 9/2005 | Karabinis | |
| 2005/0221757 A1 | 10/2005 | Karabinis | |
| 2005/0227618 A1 | 10/2005 | Karabinis et al. | |
| 2005/0239399 A1 | 10/2005 | Karabinis | |
| 2005/0239403 A1 | 10/2005 | Karabinis | |
| 2005/0239404 A1 | 10/2005 | Karabinis | |
| 2005/0239457 A1 | 10/2005 | Levin et al. | |
| 2005/0245192 A1 | 11/2005 | Karabinis | |
| 2005/0260947 A1 | 11/2005 | Karabinis et al. | |
| 2005/0260984 A1 | 11/2005 | Karabinis | |
| 2005/0265273 A1 | 12/2005 | Karabinis et al. | |
| 2005/0272369 A1 | 12/2005 | Karabinis et al. | |
| 2005/0282542 A1 | 12/2005 | Karabinis | |
| 2005/0288011 A1 | 12/2005 | Dutta | |
| 2006/0040659 A1 | 2/2006 | Karabinis | |

FOREIGN PATENT DOCUMENTS

| | | |
|---|---|---|
| EP | 0 597 225 A1 | 5/1994 |
| EP | 0 506 255 B1 | 11/1996 |
| EP | 0 748 065 A2 | 12/1996 |
| EP | 0 755 163 A2 | 1/1997 |
| EP | 0 762 669 A2 | 3/1997 |
| EP | 0 762 669 A3 | 3/1997 |
| EP | 0 797 319 A2 | 9/1997 |
| EP | 0 803 930 | 10/1997 |
| EP | 0 831 599 A2 | 3/1998 |
| EP | 0 831 599 A3 | 3/1998 |
| EP | 0 876 007 | 11/1998 |
| EP | 0876007 A2 * | 11/1998 |
| EP | 1 059 826 A1 | 12/2000 |
| EP | 1 085 658 | 3/2001 |
| EP | 1 085 684 A2 | 3/2001 |
| EP | 1 193 989 A1 | 4/2002 |
| WO | WO 00/67397 * | 11/2000 |
| WO | WO 01/54314 A1 | 7/2001 |

OTHER PUBLICATIONS

International Search Report and Written Opinion of the International Searching Authority for International application No. PCT/US2005/017297 mailed on Nov. 17, 2005.

Global.com, "Globalstar Demonstrates World's First Prototype of Terrestrial System to Supplemental Satellite Phones," http://www.globalcomsatphone.com/globalcom/globalstar_terrestrial_system.html, Jul. 18, 2002, 2 pages.

Ayyagari et al., "A satellite-augmented cellular network concept", *Wireless Networks*, Vo. 4, 1998, pp. 189-198.

Mallison et al., "Enabling Technologies for the Eurostar Geomobile Satellite," 19th AIAA Proceedings of International Communications Satellite Systems Conference, Apr. 17, 2001, 10 pgs.

* cited by examiner

SATELLITE COMMUNICATIONS SYSTEMS AND METHODS USING RADIOTELEPHONE

RELATED APPLICATION

The present application claims the benefit of U.S. Provisional Application Ser. No. 60/572,164, filed May 18, 2004 and hereby incorporated by reference herein in its entirety.

FIELD OF THE INVENTION

This invention relates to wireless communications systems and methods, and more particularly to satellite communications systems and methods.

BACKGROUND OF THE INVENTION

Satellite communications systems and methods are widely used for wireless communications of voice and/or data. Satellite communications systems and methods generally employ at least one space-based component, such as one or more satellites that are configured to wirelessly communicate with a plurality of wireless terminals.

A satellite communications system or method may utilize a single antenna beam (antenna pattern) covering an entire service area served by the system. Alternatively, in cellular satellite communications systems and methods, multiple antenna beams/cells (antenna patterns) are provided, each of which can serve substantially distinct geographical areas in an overall service area, to collectively serve an overall satellite service area. Thus, a cellular architecture similar to that used in conventional terrestrial cellular radiotelephone systems and methods can be implemented in cellular satellite-based systems and methods. The satellite typically communicates with wireless terminals over a bidirectional communications pathway, with communication signals being communicated from the satellite to the wireless terminal over a downlink or forward link, and from the wireless terminal to the satellite over an uplink or return link. The downlink (forward link) from a satellite to a radioterminal and/or the uplink (return link) from a radioterminal to a satellite may be referred to as service link(s).

The overall design and operation of cellular satellite systems and methods are well known to those having skill in the art, and need not be described further herein. Moreover, as used herein, the term "wireless terminal" includes cellular and/or satellite radiotelephones with or without a multi-line display; Personal Communications System (PCS) terminals that may combine a radiotelephone with data processing, facsimile and/or data communications capabilities; Personal Digital Assistants (PDA) that can include a radio frequency transceiver and/or a pager, Internet/Intranet access, Web browser, organizer, calendar and/or a global positioning system (GPS) receiver; and/or conventional laptop and/or palmtop computers or other appliances, which include a radio frequency transceiver, for wireless voice and/or data communications. A wireless terminal also may be referred to herein as "terminal," "radiotelephone," "user device" and/or "radioterminal". As used herein, the term "radioterminal," or any of its equivalent terms listed above, also includes any other radiating user device/equipment/source that may have time-varying or fixed geographic coordinates, and may be portable, transportable, installed in a vehicle (aeronautical, maritime, or land-based), or situated and/or configured to operate locally and/or in a distributed fashion at any other location(s) on earth and/or in space.

Cellular satellite communications systems and methods may deploy hundreds of cells (antenna patterns or spot beams), over their satellite footprint corresponding to a service area. It will be understood that large numbers of cells may be generally desirable, since the frequency reuse and the capacity of a cellular satellite communications system or method may both increase in direct proportion to the number of cells. Moreover, for a given satellite footprint or service area, increasing the number of cells may also provide a higher gain per cell, which can increase the link robustness and improve the quality of service.

The uplink and downlink communications between the wireless terminals and the satellite may utilize one or more air interfaces, including proprietary air interfaces and/or conventional terrestrial cellular interfaces, such as Time Division Multiple Access (TDMA) and/or Code Division Multiple Access (CDMA) air interfaces. A single air interface may be used throughout the cellular satellite system. Alternatively, multiple air interfaces may be used by a satellite communications system. See, for example, U.S. Pat. No. 6,052,560, issued Apr. 18, 2000, entitled Satellite System Utilizing a Plurality of Air Interface Standards and Method Employing the Same, by the present inventor Karabinis. In general, regardless of the air interface or interfaces that are used, each satellite cell generally uses at least one carrier/channel to provide service. Thus, the return service link and the forward service link each use one or more carriers/channels to provide service.

The above description has focused on communications between the satellite and the wireless terminals. However, cellular satellite communications systems and methods also generally employ a bidirectional feeder link for communications between a satellite gateway and the satellite. The bidirectional feeder link includes a forward feeder link from the gateway to the satellite and a return feeder link from the satellite to the gateway. The forward feeder link and the return feeder link each use one or more carriers/channels.

As is well known to those having skill in the art, the number of satellite cells and the air interface or interfaces that are used may impact the bandwidth that is used in the feeder link from the satellite gateway to the satellite and from the satellite to the satellite gateway. For example, if a cellular satellite system and method deploys 400 service link cells and uses a narrowband CDMA air interface to provide communications between the satellite and the wireless terminals, each CDMA carrier that is transported from the satellite gateway to the satellite may consume 1.25 MHz of feeder link spectrum. Assuming that traffic is such that only one carrier per cell is used, then 400×1.25 MHz or 500 MHz of forward feeder link bandwidth may be used. Moreover, if certain cells use more than one carrier and/or a Wideband CDMA (W-CDMA) air interface standard is used, the feeder link bandwidth may increase further.

U.S. Pat. No. 6,317,583 to Wolcott et al. describes a telecommunications satellite channelizer for mapping radio frequency (RF) signals between feeder links and mobile link beams based on a predefined frequency plan. The mobile link beams define a coverage area of a satellite. Each feeder link and mobile link beam comprises a plurality of feeder subbands and mobile subbands are grouped to form feeder link channels and mobile link channels. The channelizer includes at least one feeder lead carrying a feeder link signal associated with a ground station. A feeder link distribution network is connected to the feeder leads and maps RF signals in the feeder links onto a plurality of distribution leads as divided feeder signals. Channel multiplexers are connected to the distribution leads. Each channel multiplexer includes a set of band pass filters, each of which passes RF signals in a subset of feeder subbands corresponding to a single feeder channel in order to map a mobile link channel and a feeder link channel onto one another based on a predefined frequency plan. The channelizer groups or multiplexes signals from a plurality of feeders into each beam. Fixed local oscillator up converters shift each composite mobile channel to a common band allocated to all beams. The frequency plan is defined such that beam handovers and ground station handovers may be performed without a need for at least one of switching, retuning and resynchronization of the telecommunications satellite and the mobile terminal. See the Wolcott et al. Abstract.

U.S. Pat. No. 5,903,549 to von der Embse et al. describes a method permitting beam forming at a ground station for providing a coherent and stable uplink signal to a satellite system employing multiple spot beams by combining orthogonal synchronous code division multiplex codes and pseudo-random spreading codes with an information signal to implement a satellite feeder uplink.

Finally, published U.S. Patent Application US 2003/0224785 A1 to the present inventor Karabinis describes that information content is nonidentically mapped between service link carriers and feeder link carriers at a cellular satellite. A reduced number of satellite feeder link carriers compared to the number of satellite service link carriers and/or a reduced total bandwidth of the satellite feeder link carriers compared to the satellite service link carriers thereby may be obtained.

SUMMARY OF THE INVENTION

In some embodiments of the present invention, a return-link processor for use in a satellite communications system includes a selector that is configured to select a subset of a plurality of spatially diverse satellite signals, i.e., signals having diverse spatial content, based upon a location of a radioterminal. The return-link processor further includes a signal processor that is configured to detect a return-link transmission from the radioterminal responsive to the selected subset of the spatially diverse satellite signals. The respective spatially diverse satellite signals may include respective feed signals corresponding to respective antenna elements of a satellite service link antenna. The selector and the signal processor may be ground based.

In certain embodiments, the selector is configured to select the subset of the plurality of spatially diverse satellite signals responsive to a forward link association of the terminal, a registration of the terminal and/or location information transmitted by the terminal. For example, in some embodiments, the selector may be configured to select a first subset of the plurality of spatially diverse satellite signals responsive to a registration and/or a forward/return link beam association of the terminal, and the signal processor is configured to detect location information transmitted by the terminal responsive to the first subset of the plurality of satellite signals. The selector may be further configured to select a second subset of the plurality of spatially diverse satellite signals responsive to the detected location information, and the processor may be further configured to detect a subsequent transmission from the terminal responsive to the second subset of the plurality of spatially diverse satellite signals.

In additional embodiments of the present invention, the signal processor is operative to generate respective sets of frequency diverse signals, i.e., signals corresponding to diverse carrier frequency ranges, from the selected subset of spatially diverse satellite signals. The signal processor is further operative to detect the return-link transmission from the radioterminal from at least one of the sets of frequency diverse signals. For example, the signal processor may include a channelization and frequency translation unit configured to generate the sets of frequency diverse signals, and a performance-enhancing signal processor configured to detect the return-link transmission from the radioterminal from at least one of the sets of frequency diverse signals.

According to further embodiments of the present invention, a satellite communications system includes a satellite configured to receive radioterminal transmissions from a service region and means for generating a plurality of spatially diverse signals from the received radioterminal transmissions. The system also includes a return-link processor configured to select a subset of the plurality of spatially diverse signals based upon a location of a radioterminal and to detect a return-link transmission from the radioterminal responsive to the selected subset of the spatially diverse signals. The means for generating a plurality of spatially diverse signals from the received radioterminal signals may include an antenna of the satellite; and respective ones of the spatially diverse signals may include respective feed signals corresponding to respective elements of the antenna. The means for generating a plurality of spatially diverse signals from the received radioterminal signals may further include a satellite-based return-link processor configured to receive first spatially diverse signals from the satellite antenna and to responsively generate a feeder link signal including second spatially-diverse signals, wherein the satellite-based return-link processor spectrally distributes the second spatially diverse signals in the feeder link signal according to spatial associations thereof. The return-link processor may be configured to select a subset of the plurality of spatially diverse signals responsive to the feeder link signal.

In some embodiments, the return-link processor may be configured to select the subset of the plurality of spatially diverse signals responsive to a forward link association of the terminal, a registration of the terminal and/or location information transmitted by the terminal. For example, the return-link processor may be configured to select a first subset of the plurality of spatially diverse signals responsive to a registration and/or forward/return link beam association of the terminal, to detect location information transmitted by the terminal responsive to the first subset of the plurality of spatially diverse signals, to select a second subset of the plurality of spatially diverse signals responsive to the detected location information, and to detect a subsequent transmission from the terminal responsive to the second subset of the plurality of spatially diverse signals.

In further embodiments, the return-link processor is operative to generate respective sets of frequency diverse signals from the selected subset of spatially diverse signals for respective sets of carrier frequencies, and to detect the return-link transmission from the radioterminal from at least one of the sets of frequency diverse signals. The return-link processor may include a selector configured to select the subset of spatially diverse signals, a channelization and frequency translation unit configured to generate the sets of frequency diverse signals from the subset of spatially diverse signals, and a performance-enhancing signal processor configured to detect the return-link transmission from the radioterminal from at least one of the sets of frequency diverse signals.

In still further embodiments of the present invention, a satellite communications system includes a satellite-based return-link processor configured to receive first spatially diverse signals from a satellite antenna and to responsively generate a feeder link signal. The satellite-based return-link processor spectrally distributes second spatially diverse signals in the feeder link signal according to spatial associations thereof. The system further includes a ground-based return-link processor configured to select a subset of the second spatially diverse signals based upon a location of a radioterminal and to detect a return-link transmission from the radioterminal responsive to the selected subset of the second spatially diverse signals.

According to additional embodiments of the present invention, a satellite communications method includes generating a plurality of spatially diverse signals responsive to radioterminal transmissions from a service area served by a satellite. A subset of the plurality of spatially diverse signals is selected based upon a location of a radioterminal, and a return-link transmission from the radioterminal is detected responsive to the selected subset of the spatially diverse signals. Respective ones of the spatially diverse signals may include respective feed signals corresponding to respective elements of an antenna at the satellite. Selecting a subset of the plurality of spatially diverse signals based upon a location of a radioterminal may include selecting the subset of the plurality of spatially diverse signals based on a forward link association of the terminal, a registration of the terminal and/or location information transmitted by the terminal.

Selection of a subset of the plurality of spatially diverse signals based upon a location of a radioterminal may be preceded by transmitting the plurality of spatially diverse signals from the satellite to a ground station. Generating a plurality of spatially diverse signals from radioterminal transmissions from a service area served by a satellite may include generating first spatially diverse signals from a satellite antenna, and generating a feeder link signal including second spatially diverse signals responsive to the first spatially diverse signals, including spectrally distributing the second spatially diverse signals in the feeder link signal according to spatial associations thereof. Selecting a subset of the plurality of spatially diverse signals based upon a location of a radioterminal may include selecting a subset of the second spatially diverse signals based upon the location of the radioterminal. Detecting a return-link transmission from the radioterminal responsive to the selected subset of the spatially diverse signals may include detecting the return-link transmission from the radioterminal responsive to the selected subset of the second spatially diverse signals.

In further embodiments, selecting a subset of the plurality of spatially diverse signals based upon a location of a radioterminal includes selecting a first subset of the plurality of spatially diverse signals responsive to a registration and/or a forward/return link beam association of the terminal. Detecting a return-link transmission from the radioterminal responsive to the selected subset of the spatially diverse signals includes detecting location information transmitted by the terminal responsive to the first subset of the plurality of spatially diverse signals. Selecting a subset of the plurality of spatially diverse signals based upon a location of a radioterminal further includes selecting a second subset of the plurality of spatially diverse signals responsive to the detected location information. Detecting a return-link transmission from the radioterminal responsive to the selected subset of the spatially diverse signals further includes detecting a subsequent transmission from the terminal responsive to the second subset of the plurality of spatially diverse signals.

DETAILED DESCRIPTION

Figure 1:
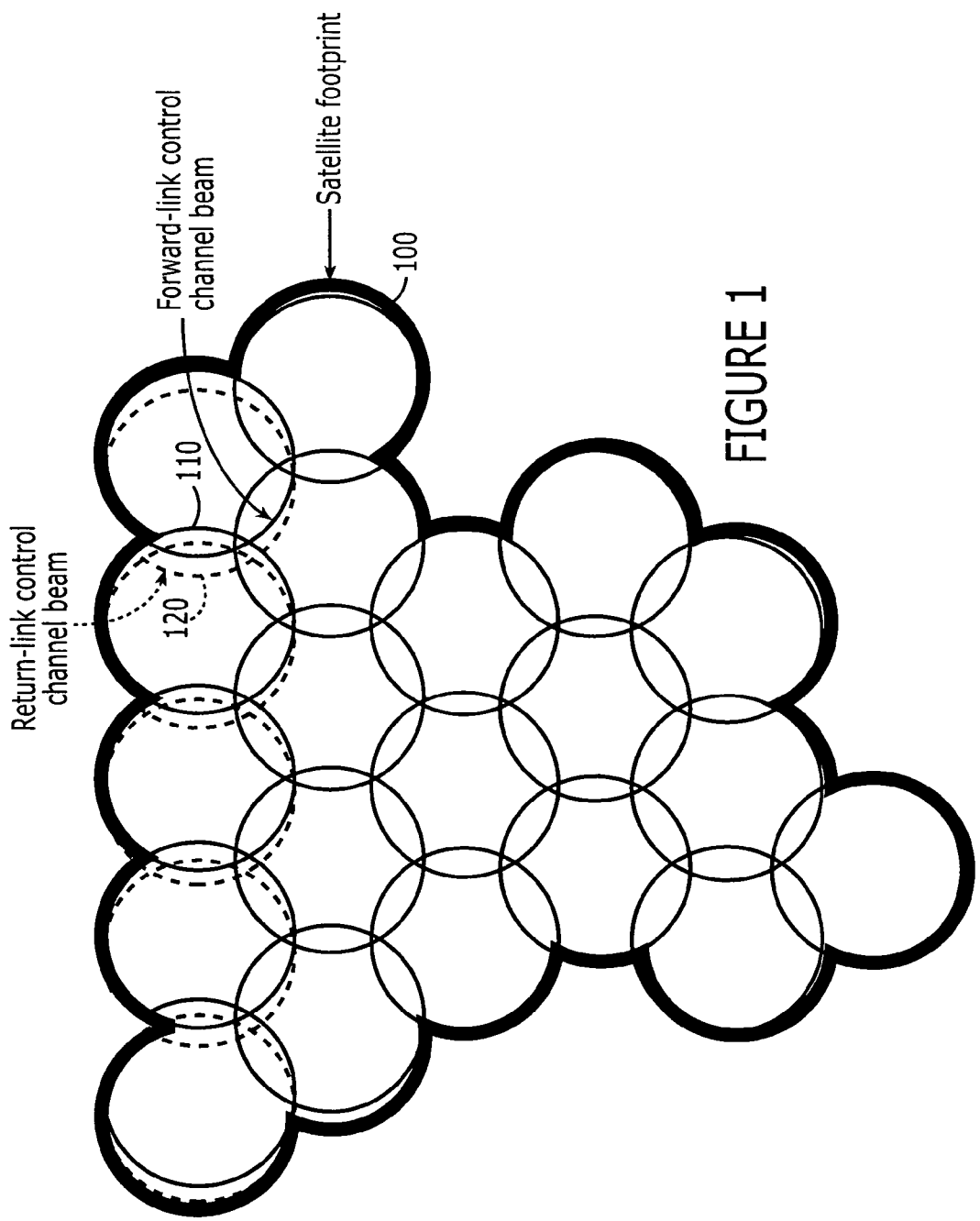
FIG. 1 illustrates exemplary forward and return-link beam patterns in a satellite communications system.

Specific exemplary embodiments of the invention now will be described with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, like designations refer to like elements. It will be understood that when an element is referred to as being "connected", "coupled" or "responsive" to another element, it can be directly connected, coupled or responsive to the other element or intervening elements may be present. Furthermore, "connected", "coupled" or "responsive" as used herein may include wirelessly connected, coupled or responsive.

The terminology used herein is for the purpose of describing particular embodiments only and is not intended to be limiting of the invention. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It will be understood that although the terms first and second may be used herein to describe various elements, these elements should not be limited by these terms. These terms are only used to distinguish one element from another element. Thus, a first radiotelephone below could be termed a second radiotelephone, and similarly, a second radiotelephone may be termed a first radiotelephone without departing from the teachings of the present invention. As used herein, the term "and/or" includes any and all combinations of one or more of the associated listed items. The symbol "/" is also used as a shorthand notation for "and/or".

Some embodiments of the present invention may arise from a recognition that in transporting a set of return service link antenna feed element signals from a satellite service link antenna to a location distant to the satellite, over a satellite return feeder link, in order to further process the set of return service link antenna feed element signals at the location distant to the satellite and thus allow return service link beam forming, no specific coherency relation need be maintained between the set of return service link antenna feed element signals that are being transported from the satellite to the location distant to the satellite. Furthermore, no specific coherency relation need be maintained in transporting a set of forward service link antenna feed element signals from a location distant to a satellite, to a set of antenna feed elements of a satellite's forward service link antenna, over a forward satellite feeder link, in order to allow forward service link beam forming. No specific return and/or forward link signal coherency need be maintained among the respective sets of return and/or forward service link antenna feed element signals as the return and/or forward service link antenna feed element signals propagate through one or more system elements, because the algorithms used to form the return and/or forward service link beams are adaptive and capable of substantially correcting for relative phase and/or amplitude variations between two or more antenna feed element signals that are processed to form a satellite service link beam (cell) of the return or forward type. Accordingly, reduced complexity return and/or forward service link beam forming may be provided in accordance with some embodiments of the invention.

In some embodiments of the present invention, a return service link beam former, which may be, for example, a ground based return service link beam former (e.g., located in, or associated with, a satellite gateway and/or other system element), can be used to reduce or cancel an interference among a set of non-coherent signals, received at the beam former from a set, of the satellite antenna return service link antenna feed elements, and the beam former may form a substantially optimum return service link beam (cell) over a geographic area associated with a desired signal source that is included in the set of return service link antenna feed element signals provided to the return service link beam former, to thereby substantially maximize a desired signal performance measure, such as, for example, a Signal to Interference plus Noise ratio (S/I+N) and/or a Bit Error Rate (BER). It will be understood that the set of non-coherent return service link signals received at the return link beam former from a respective set of satellite antenna return service link feed elements comprises content that may be correlated and/or dependent between at least two of the set of return service link antenna feed element signals and that the set of non-coherent signals received at the beam former from the respective set of satellite antenna return service link feed elements may comprise a complete set or a subset of the return service link antenna feed elements of a return service link antenna of a satellite. Furthermore, it will be understood that in some embodiments, the set of return and/or forward non-coherent signals may be a set of return and/or forward coherent signals. Return and/or forward service link beam forming, according to some embodiments of the invention, may be based on an identification of a geographic area associated with a signal source, such as, for example, a geographic area associated with a location of a radioterminal, to select a subset of the return and/or forward service link antenna feed element signals of a satellite for processing.

FIG. 1 illustrates a set of forward and return service link beams (cells) 110, 120, respectively, that may be formed by, for example, a satellite over the satellite's service footprint 100. Each one of the forward service link beams 110 may be configured to radiate at least one forward service link channel, such as, for example, a forward service link Broadcast Control CHannel (BCCH). Each one of the return service link beams 120 may be configured to receive at least one return service link channel, such as, for example, a return service link Random Access CHannel (RACH), that may be radiated by one or more radioterminals over at least one of the return service link beams 120. The set of forward service link beams 110 may be congruent, substantially congruent, or substantially non-congruent relative to the set of return service link beams 120 and the set of forward and/or return service link beams (cells), 110, 120, may have regions of overlap therebetween or may be non-overlapping. The entire satellite footprint 100, or substantially the entire satellite footprint 100, or a part of the satellite footprint 100 may be covered by the set of forward and/or return service link beams (cells) 110, 120 and the set of forward and/or return service link beams (cells), 110, 120, may be formed by, and/or correspond to geographic areas associated with, the forward and return service link antenna feed elements, respectively, of a satellite. In some embodiments, for example, a given forward service link beam (cell) 110 may be formed by an excitation provided to a single corresponding forward service link antenna feed element of a satellite and a given return service link beam (cell) 120 may be formed and/or defined by a corresponding single return service link antenna feed element of a satellite (that is, is defined by a geographic field-of-view of a single corresponding return service link antenna feed element of the satellite). In other embodiments, a given forward service link beam (cell) 110 may be formed by a plurality of excitations provided to a respective plurality of forward service link antenna feed elements of a satellite and a given return service link beam (cell) 120 may be formed by processing signals received by a plurality of return service link antenna feed elements of a satellite. In some embodiments, a forward service link beam (cell) 110 has an associated geographic area that is larger, smaller or substantially the same compared to a geographic area associated with a return service link beam (cell) 120, a geographic area associated with a forward service link antenna feed element and/or a geographic area associated with a return service link antenna feed element.

A number of forward service link beams 110 may differ from a number of return service link beams 120. In some embodiments, a reduced or minimum number of forward service link beams 110 may be formed over a desired satellite footprint 100 compared to a number of return service link beams 120, in order to reduce or minimize power expended by a satellite in providing a forward service link channel (or channels), such as a forward service link control channel and/or a forward service link broadcast channel. In some embodiments, only one (geographically large) forward-link beam 110, such as a global forward-link beam, may be generated by a satellite to provide a forward service link channel or channels.

In other embodiments, a satellite may be configured to generate a plurality of forward service link frequency reuse cluster sets wherein each forward service link frequency reuse cluster set is providing at least one forward service link channel using at least one frequency of a satellite frequency band, and wherein at least one frequency reuse cluster set of the plurality of forward service link frequency reuse cluster sets differs from an other frequency reuse cluster set of the plurality of forward service link frequency reuse cluster sets in: (a) a number of satellite beams (cells) defining a frequency reuse cluster of the frequency reuse cluster set, (b) a geographic area associated with a frequency reuse cluster of the frequency reuse cluster set, (c) at least one frequency used by the frequency reuse cluster of the frequency reuse cluster set, (d) a number of frequency reuses over a satellite footprint of the frequency reuse cluster set, (e) a communications service (s) provided by the frequency reuse cluster set, (f) a maximum system bandwidth utilized by the frequency reuse cluster set, and/or (g) a maximum EIRP utilized by the frequency reuse cluster set. For example, a satellite may be configured to form a first and a second forward service link frequency reuse cluster set wherein the first forward service link frequency reuse cluster set comprises, for example, a three-cell reuse cluster size that is repeated over a satellite footprint 100, for example, 65 times, to form the first forward service link frequency reuse cluster set (comprising 65 elements), and wherein the second forward service link frequency reuse cluster set comprises, for example, a seven-cell reuse cluster size that is repeated over the satellite footprint 100, for example, 36 times to form the second forward service link frequency reuse cluster set (comprising 36 elements). Furthermore, the first forward service link frequency reuse cluster set may be using frequencies F1 to provide at least one forward service link channel and the second forward service link frequency reuse cluster set may be using frequencies F2 to provide at least one forward service link channel, wherein the frequencies F1 may be substantially different than the frequencies F2. Analogously to the forward service link frequency reuse cluster sets, a satellite may, in some embodiments, be configured to form a plurality of return service link frequency reuse cluster sets.

The forward and/or return service link beams (cells) 110, 120 of FIG. 1 may be a priori determined and/or substantially fixed relative to one or more geographic reference locations, and/or may be reconfigurable, relative to one or more geographic reference locations. The forward and/or return service link beams 110, 120 may, for example, be configured and/or reconfigured by a satellite and/or a beam former at the satellite and/or at a location external to the satellite, in response to at least one signal that is received by the satellite from at least one transmitter and/or transceiver that may be located at a known/predetermined geographic location. The forward and/or return service link beams 110, 120 may be configured to transmit and/or receive at least one forward link channel and at least one return link channel, such as a forward link control channel and a return link control channel, that may be used by at least one radioterminal and/or a system element, such as, for example, an infrastructure element of a gateway of a system, to initiate communications between the system and the at least one radioterminal.

A radioterminal that is located within, or proximate to, a satellite service footprint 100 and within, or proximate to, a given forward-link beam 110 of FIG. 1 may receive and process a forward service link channel, such as a forward link control channel, provided by the given forward service link beam 110, and, according to some embodiments, may also receive and process at least one other forward service link channel provided by another forward service link beam 110 that may be proximate and/or adjacent to the given forward service link beam. In response to the reception and processing of the forward service link channel(s), the radioterminal may send a message to the system, via one or more return link channel(s), in order, for example, to register with the system and/or to request an initiation of communications service. The message sent by the radioterminal to the system may be received by the system via the return service link channel(s), with maximum signal strength and/or maximum quality over a return service link beam 120 whose geographic footprint contains the radioterminal, and the system may thus determine, in response to a received message strength, quality, and/or information content, an approximate location of the radioterminal by association of the radioterminal with the return link beam 120 over which the radioterminal message is received by the system with a maximum or near maximum strength and/or quality and/or by the information content of the message which may be indicative of an approximate location of the radioterminal. Other techniques, such as inclusion of information generated by network-assisted and/or stand-alone GPS (Global Positioning System) in a registration request or other message from the radioterminal to the system, also may be used by the system to identify and/or estimate a location of the radioterminal.

The message sent by the radioterminal to the system may also be received by the system over other return service link beams 120 that are proximate and/or adjacent to the return service link beam whose geographic footprint contains the radioterminal, and the system may combine contributions of the received message from a plurality of beams and/or satellite antenna feed elements to improve detection performance of the radioterminal's message and/or estimation accuracy of the radioterminal's position. The approximate location of the radioterminal as determined by the system, may be used by the system to form what is referred to herein as an "optimum" return service link beam having increased gain, maximum gain, or near maximum gain, over the geographic location where the radioterminal is located, and receive over this optimum return service link beam communications information, including signaling, from the radioterminal. In some embodiments of the present invention, the system may form the optimum return service link beam by processing signals of a set of antenna feed elements that may be operative to receive signals from a geographic area containing the radioterminal. The signals of the set of antenna feed elements need not be transported coherently to the ground such as, for example, to a satellite gateway (i.e., with substantially unaltered relative phases) according to some embodiments of the present invention, as will be described in detail below.

Figure 2:
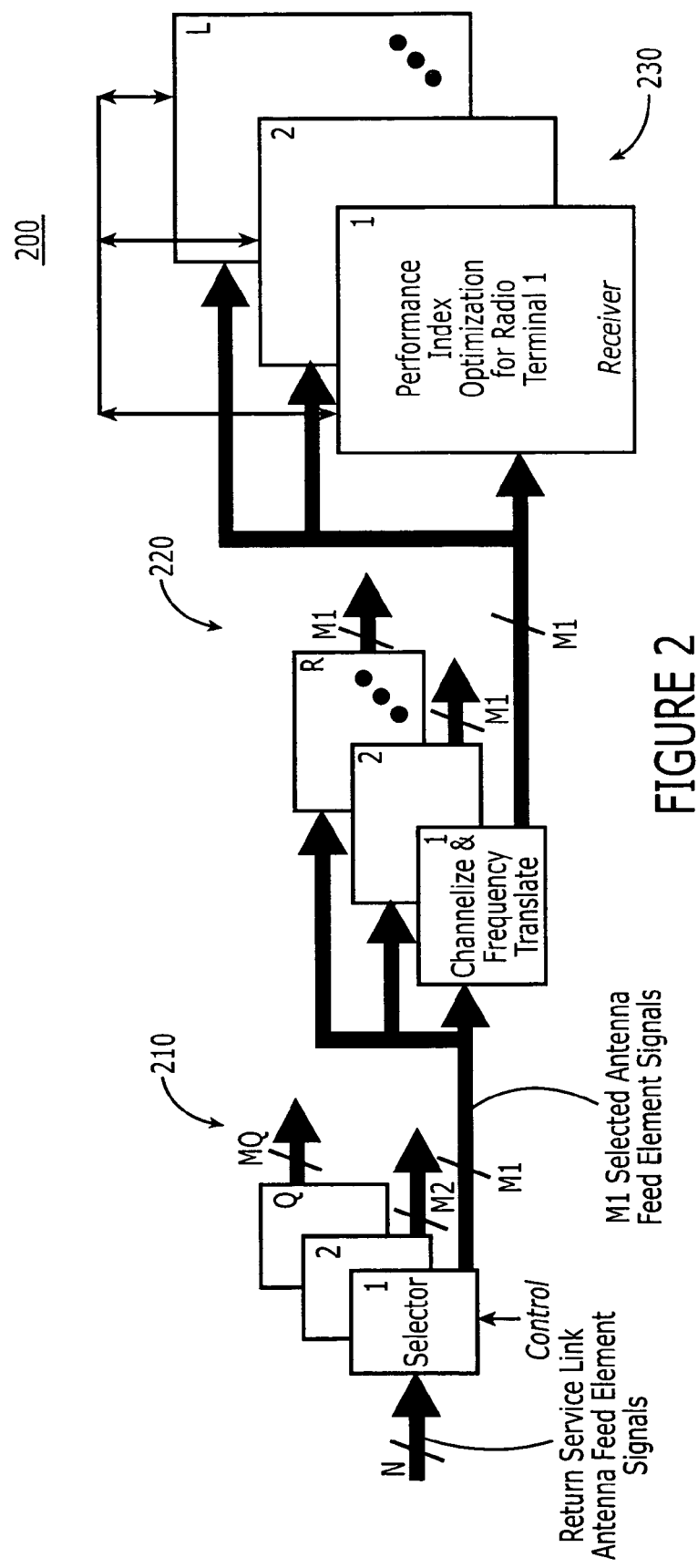
FIG. 2 is a schematic diagram illustrating a return-link processor according to some embodiments of the present invention.

FIG. 2 illustrates a return-link processor 200 that may be operative, on the ground at a satellite gateway or elsewhere in a satellite communications system, to form at least one optimum return service link beam relative to one or more radioterminals. As is illustrated in FIG. 2, N signals, which may be derived from N respective return service link antenna feed elements of a satellite antenna, may be transported to the ground via a satellite return feeder link and may serve as inputs to a selector 210 that may be operative to select at least one of the inputs for further processing. In FIG. 2, it will be understood that, generally, each one of the N signals may include signals from multiple radioterminals, which may use any of a number of different carrier frequencies available to the system. It will be further appreciated that the N signals may correspond to actual (physical) antenna feed elements and/or to synthetic feed elements derived from combining actual (physical) antenna feed element outputs using, for example, beamforming networks, and that, in general, the N signal inputs of FIG. 2 include diverse spatial content, i.e., include signal energies from diverse locations, which may be disjoint and/or overlapping in space, time and/or frequency.

Still referring to FIG. 2, based on a location of the one or more radioterminals, a control signal may be generated that instructs the selector 210 to select and output M1 out of the N signal inputs, where M1≦N. In a channelization and frequency translation unit 220, the selected M1 signals may be further processed ("channelized") to extract signals corresponding to R carrier frequencies that may be/are used by the one or more radioterminals to transmit information on a return link. The signals derived from each one of the selected M1 return service link antenna feed element signals may be frequency translated to a common, or substantially common, Intermediate Frequency (IF) or to baseband.

Thus, M1 versions of a return service link carrier that may be radiated by a radioterminal may be received by M1 return service link antenna feed elements of a satellite service link antenna that may be configured to receive signals from a region containing the radioterminal. The M1 versions of a return service link carrier that may have been frequency translated, as illustrated in FIG. 2, to a substantially common IF or to baseband, provide signals that serve as inputs to a performance index optimizing signal processor 230, which may be operative to optimize (or substantially optimize) a performance index, for example, to minimize a mean-squared error in recovering information for each radioterminal. As is well known to those skilled in the art, an a priori known data sequence may be inserted into a return-link waveform radiated by a radioterminal, and this a priori known data sequence (i.e., a pilot signal) may be used by the signal processor 230 to achieve a desired performance index optimization. Alternatively and/or in addition to using an a priori known data sequence to optimize communications performance with respect to a performance index, the signal processor 230 may achieve a desired performance index optimization via decision-directed techniques known to those skilled in the art.

Embodiments of the present invention may be used with standalone satellite radioterminal systems and methods, and/or with a combined terrestrial/satellite radioterminal system. As is well known to those having skill in the art, terrestrial networks can enhance cellular satellite radioterminal system availability, efficiency and/or economic viability by terrestrially reusing at least some of the frequency bands that are allocated to cellular satellite radioterminal systems. Satellite radioterminal communications systems and methods that may employ terrestrial reuse of satellite frequencies are described in U.S. Pat. No. 6,684,057 to Karabinis, entitled Systems and Methods for Terrestrial Reuse of Cellular Satellite Frequency Spectrum; and Published U.S. Patent Application Nos. US 2003/0054760 to Karabinis, entitled Systems and Methods for Terrestrial Reuse of Cellular Satellite Frequency Spectrum; US 2003/0054761 to Karabinis, entitled Spatial Guardbands for Terrestrial Reuse of Satellite Frequencies; US 2003/0054814 to Karabinis et al., entitled Systems and Methods for Monitoring Terrestrially Reused Satellite Frequencies to Reduce Potential Interference; US 2003/0073436 to Karabinis et al., entitled Additional Systems and Methods for Monitoring Terrestrially Reused Satellite Frequencies to Reduce Potential Interference; US 2003/0054762 to Karabinis, entitled Multi-Band/Multi-Mode Satellite Radiotelephone Communications Systems and Methods; US 2003/0153267 to Karabinis, entitled Wireless Communications Systems and Methods Using Satellite-Linked Remote Terminal Interface Subsystems; US 2003/0224785 to Karabinis, entitled Systems and Methods for Reducing Satellite Feeder Link Bandwidth/Carriers In Cellular Satellite Systems; US 2002/0041575 to Karabinis et al., entitled Coordinated Satellite-Terrestrial Frequency Reuse; U.S. Pat. No. 6,859,652 to Karabinis et al., entitled Integrated or Autonomous System and Method of Satellite-Terrestrial Frequency Reuse Using Signal Attenuation and/or Blockage, Dynamic Assignment of Frequencies and/or Hysteresis; U.S. Pat. No. 6,785,543 to Karabinis et al., entitled Space-Based Network Architectures for Satellite Radiotelephone Systems; US 2003/0143949 to Karabinis, entitled Filters for Combined Radiotelephone/GPS Terminals; US 2003/0153308 to Karabinis, entitled Staggered Sectorization for Terrestrial Reuse of Satellite Frequencies; and US 2003/0054815 to Karabinis, entitled Methods and Systems for Modifying Satellite Antenna Cell Patterns In Response to Terrestrial Reuse of Satellite Frequencies, all of which are assigned to the assignee of the present invention, the disclosures of all of which are hereby incorporated herein by reference in their entirety as if set forth fully herein.

In optimizing a performance index, a return-link processor such as the return-link processor 200 illustrated in FIG. 2 may be configured to jointly form a return service link satellite beam (antenna pattern) and reduce the interference from an Ancillary Terrestrial Network (ATN) and/or other interference simultaneously or substantially simultaneously in one stage. Alternatively, a multiple stage receiver may be used, as will be recognized by those having skill in the art, that may be configured to optimize a performance index per stage, in which the performance indices used by the multiple-stage receiver may all be the same, substantially the same, or different between stages. For example, a two stage receiver may be configured to form an optimum return-link beam in a first stage, based, for example, on minimizing a mean-squared error at the receiver observation times, and reduce a level of ATN-induced interference and/or other interference in a second stage, based, for example, on a zero-forcing performance index. It will be understood that a multiple-stage receiver may be configured to optimize a plurality of performance indexes simultaneously, substantially simultaneously or sequentially.

In addition, as is illustrated in FIG. 2, return-link processor elements corresponding to processing signals received from a radioterminal 1 may be configured to exchange information with other receiver elements that may be configured to process signals received from other radioterminals 2, 3, . . . , L that may be radiating signals over a set of frequencies common, at least partially, to the frequencies being radiated by the radioterminal 1. This multi-user detection aspect of the return-link processor 200 illustrated in FIG. 2 may be used, in some embodiments, to further improve communications performance by mitigating co-frequency interference induced by other users (radioterminals 2 through L) who are also radiating, at least partially, the frequencies being radiated by radioterminal 1. Multi-user detection techniques are known to those skilled in the art and need not be described further herein.

Still referring to FIG. 2, the number of "selectors" Q, may be larger, equal to, or smaller than the number of return service link antenna feed elements N. The number of "channelizers & frequency translators" per selector, R, may depend on the number of carrier frequency sets that may be radiated by the system's radioterminals. This number, R, may also depend on the available service link spectrum of the system and on the air interface protocol(s) used by the system's radioterminals to communicate.

Figure 3:
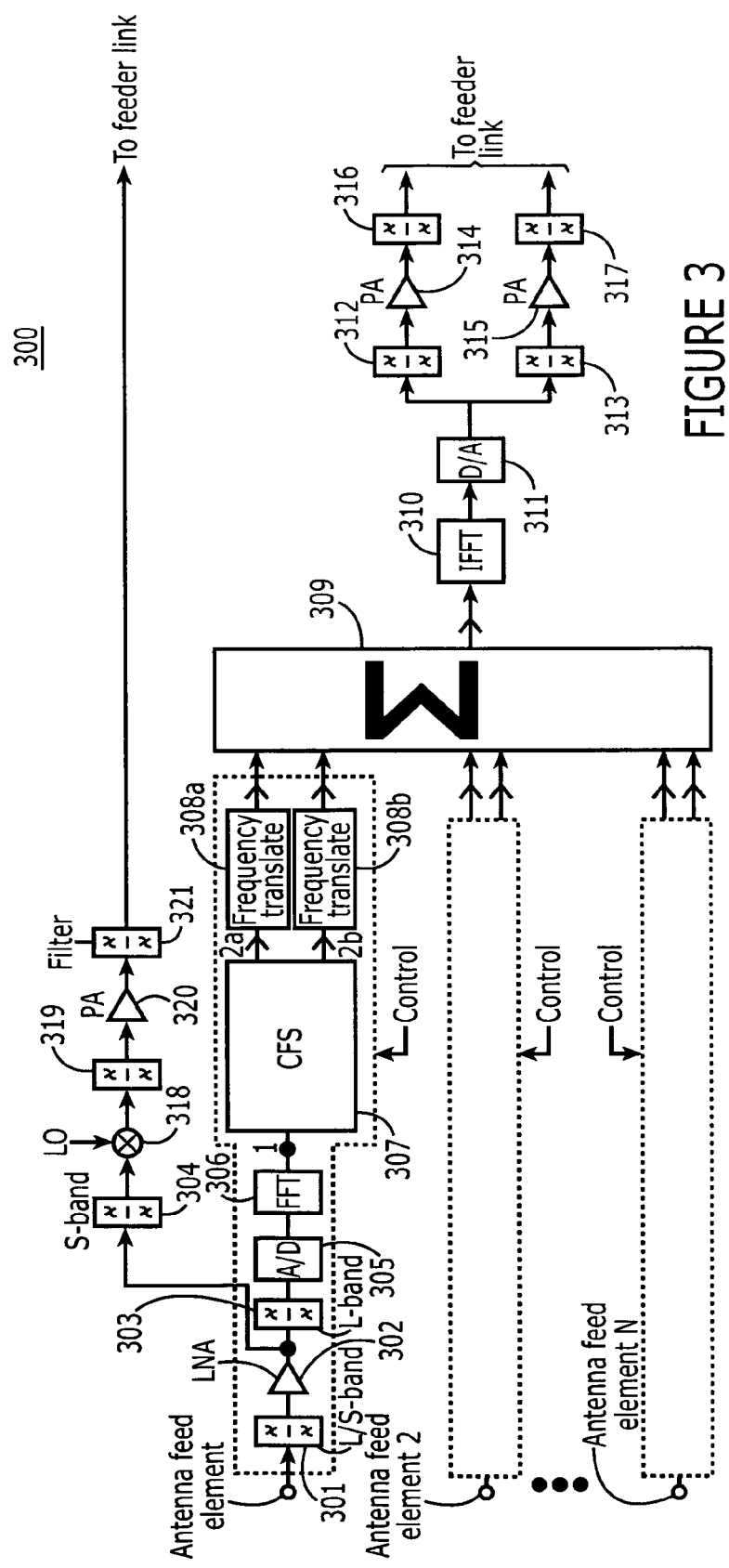
FIG. 3 is a schematic diagram illustrating a return-link processor according to further embodiments of the present invention.

FIG. 3 illustrates a return-link signal processor 300 that may be configured at a satellite to process signals received by N return service link antenna feed elements of a return service link antenna of the satellite. The illustrative embodiment depicted in FIG. 3 assumes a satellite that is operative on two bands; a first band such as an L-band, and a second band such as an S-band. As such, an aggregate signal of a return service link antenna feed element, such as return service link antenna feed element 1, may be filtered by a front-end block filter, such as an L/S-band block filter 301, as illustrated in FIG. 3, which may be configured to allow at least some of the frequencies of the two bands (i.e., at least some of the L- and S-band frequencies) to appear at its output substantially un-attenuated. A Low-Noise Amplifier (LNA) 302 may be operatively connected to the output of the front-end L/S-band block filter 301 to provide signal amplification. The output of the LNA 302 may be operatively connected to a first band-pass filter, such as an L-band band-pass filter 303, and a second band-pass filter, such as an S-band band-pass filter 304.

Figure 4A:
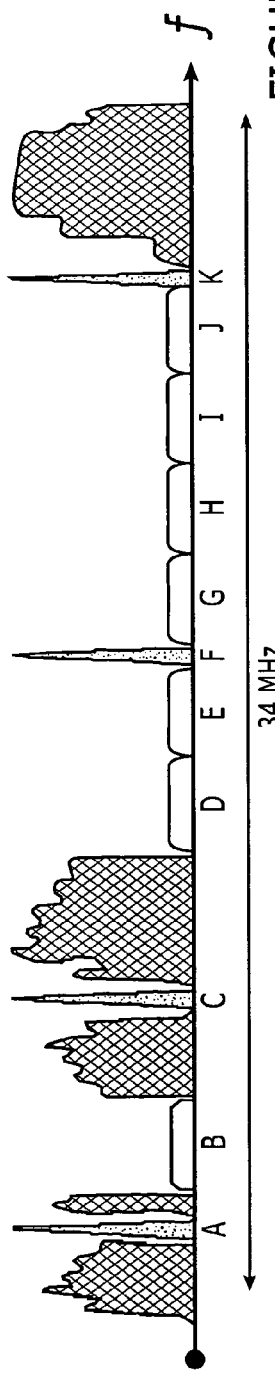
FIG. 4a-c are spectral distribution diagrams illustrating selective spectral redistribution operations on spatially diverse antenna feed signals according to some embodiments of the present invention.

As is illustrated in FIG. 3, the output signal of the first (L-band) band-pass filter 303 may be converted from a continuous-time representation to a discrete-time representation by, for example, an Analog-to-Digital (A/D) converter 305 and may then be transformed to a frequency-domain representation by, for example, a Fast Fourier Transform (FFT) 306. Thus, for example, the first band (L-band) frequency-domain representation of a signal of an antenna feed element, such as a signal of antenna feed element 1, may have an amplitude-as-a-function-of-frequency characteristic as that illustrated by FIG. 4a. The portions A-K of the frequency characteristic that is illustrated in FIG. 4a may represent signals that the system may need to process further, while other signals illustrated in FIG. 4a (such as the unlabeled signals) may represent signals that the system does not need to process further and may thus be substantially separated and discarded.

Accordingly, a Channelization and Filtering Stage ("CFS") 307 illustrated in FIG. 3 may be operatively connected to an output of the FFT 306 to substantially identify, separate, and/or discard signals that the system may not need to process further. As such, at an output of CFS 307, only the signals A-K of FIG. 4a may appear. All the signals A-K may appear on one output port of CFS 307, arranged as a function of frequency in any desired order, contiguous or not contiguous as a function of frequency, or they may appear on different (two or more) output ports of CFS 307 in accordance with any desired grouping and/or arrangement as a function of frequency.

Figure 4B:
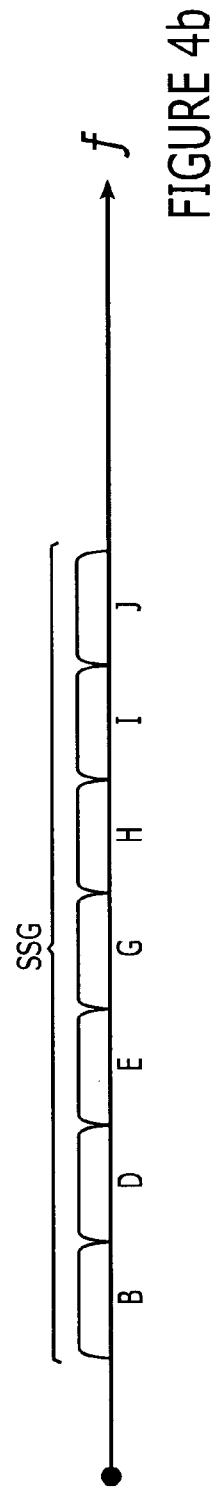
Figure 4C:
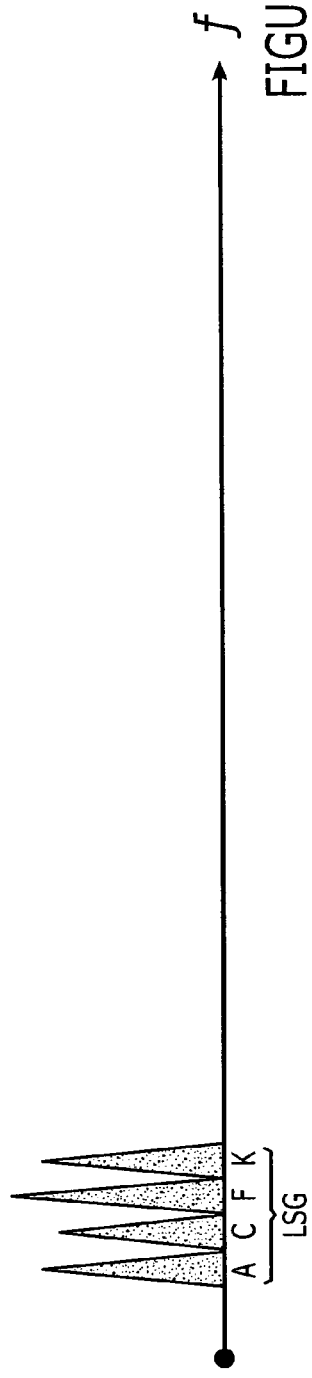

For example, FIG. 3 illustrates a CFS 307 configured with two output ports 2a, 2b on which the signal groupings illustrated in FIGS. 4b and 4c, respectively, may appear. The signal grouping of FIG. 4b represents a "small signal grouping" (SSG) and the signal grouping of FIG. 4c represents a "large signal grouping" (LSG), where the terms "small" and "large" are used herein to describe relative signal strength. In some embodiments, CFS 307 is configured with at least two output ports where relatively small signals (SSG) may appear on a first output port 2a and where relatively large signals (LSG) may appear on a second output port 2b. In other embodiments, a third output port may be configured to provide signals that have a relative measure that is between the relatively small and relatively large signals. Such partitioning of signals in accordance with measures of relative strength, as described above and illustrated in FIGS. 3 and 4a-c, may be used, in some embodiments, to separate and amplify separately different categories of signals to thereby reduce an impact of inter-modulation products that may be generated by a non-linear device such as an amplifier.

Additional frequency translation of signals appearing at the output port(s) 2a, 2b of the CFS 307 may be introduced by frequency translators 308a, 308b in order to distribute the signals over appropriate frequency sub-bands of a return feeder link band. Alternatively, or in combination with frequency translation performed external to the CFS 307, the CFS 307 may also be configured with a function of frequency translation to the extent necessary to position signals within designated frequency sub-bands of a return feeder link band.

Still referring to FIG. 3, the processed (as described above) return service link antenna feed element signals of the satellite service link antenna sub-system may be combined in a summer (Σ) 309, transformed to a discrete-time domain representation by, for example, an Inverse FFT (IFFT) 310, and then converted to a continuous-time domain representation by, for example, a D/A converter 311, as is illustrated in FIG. 3. It will be understood that, in some embodiments, different frequency translators 308a, 308b, operating on different antenna feed element signals, may introduce different frequency translations to thereby position the different signals over different, substantially non-overlapping, frequency intervals. Furthermore, it will be understood that in some embodiments, the operations of combining and transforming to the discrete-time domain may be inter-changed so as to first transform to discrete-time domain and then combine. In still other embodiments, the processed and frequency translated signals of a return-link antenna feed element of the satellite antenna sub-system may first be transformed to the discrete-time domain and then combined with other similarly processed return-link antenna feed element signals.

Still referring to FIG. 3, first and second band-pass filters 312, 313 are operatively connected to an output of the D/A converter 311 to substantially select and separate first and second portions, respectively, of an aggregate signal appearing at the output of the D/A converter 311. The first and second portions may correspond to the SSG and LSG signals (FIGS. 4b and 4c), respectively, of one or more of the return service link antenna feed elements. The substantially selected and separated first and second portions of the aggregate signal appearing at the output of the D/A converter 311 are amplified by first and second power amplifiers 314, 315, respectively, and after additional filtering that may be imposed on output signals of the power amplifiers by respective filters 316, 317 (as illustrated in FIG. 3) the signals may be sent to additional elements of the satellite's feeder link sub-system (i.e., combiner(s), antenna feed element(s), antenna(s); not shown in FIG. 3) for further conditioning/processing and transportation to one or more satellite gateway(s). It will be understood that the outputs of the filters 316, 317 that are transmitted over a return feeder link to a satellite gateway may each include spectrally distributed signal groups that correspond to respective ones of the N antenna feed element signals, which, after appropriate frequency translation, may provide plural antenna feed element signals for input to a ground-based return-link processor, such as the processor 200 of FIG. 2. Relative to the placement/positioning of summer 309 of FIG. 3, it will be understood that summer 309 is positioned prior to IFFT 310 in order to reduce a number of IFFT functions and/or other functions such as D/A, PA and/or filter functions that may, otherwise, be needed if the summer 309 were positioned in any alternate way, such as, for example, following filters 316, 317.

As stated earlier, the illustrative embodiment depicted in FIG. 3 assumes a satellite that is operative over two bands of frequencies; a first band such as an L-band of frequencies, and a second band such as an S-band of frequencies. As such, an output of the LNA 302 is operatively connected to a first band-pass filter, such as an L-band band-pass filter 303, and a second band-pass filter, such as an S-band band-pass filter 304. The second band of frequencies, such as, for example, at least a portion of an S-band of frequencies, which may be allowed to appear at the output of the S-band filter 304 substantially un-attenuated, may be a substantially contiguous band of desired signal frequencies and may not contain signals, such as the unlabelled signals of FIG. 4a, that may need to be identified and substantially removed before transporting the second band of frequencies signal to a satellite gateway. As such, the signal processing for the second band of frequencies signal(s) may be reduced and/or simplified relative to the signal processing that has been described in connection with the first band of frequencies signal(s). FIG. 3 illustrates analog (continuous-time) signal processing for the second band of frequencies signal(s) comprising filtering stages 319, 321, at least one frequency translation stage using a local oscillator (LO) and mixer 318, and a power amplifier (PA) stage 320. Although the embodiment of FIG. 3 illustrates purely analog signal processing for the second band of frequencies signal(s) it will be understood that at least some of the analog signal processing stages shown may be replaced, in part or entirely, by digital (discrete-time) equivalents. Moreover, in other embodiments, the satellite may be operative in only one band of frequencies so that the L-band or S-band portions of the processor of FIG. 3 need not be present.

In some embodiments of the invention, a return-link receiver of a space-based network may be configured to process a plurality of signals provided to the return-link receiver by a corresponding plurality of return service link antenna feed elements of a space-based component (such as a satellite) of the space-based network. The return-link receiver, may be configured at a distance from the space-based component (i.e., at a ground facility such as, for example, a satellite gateway of the space-based network), and may further, according to some embodiments of the invention, be configured to process the plurality of signals provided to the return-link receiver by the corresponding plurality of return service link antenna feed elements of the space-based component of the space-based network, substantially continuously in time in search of an identification message from one or more radioterminals. The identification message may be, for example, a registration message and/or a request-for-service (such as a request for call establishment) message. The one or more radioterminals, responsive to information provided by a forward service link message/channel (such as a broadcast control message/channel) that may be radiated by the space-based component, may be configured to radiate the identification message at a predetermined return service link frequency or frequencies and the return-link receiver(s) may be configured to process the plurality of signals provided to the return-link receiver(s), at the predetermined return service link frequency or frequencies thereby searching for and/or detecting the identification message. The forward service link message/channel that may be radiated by the space-based component, may, in some embodiments, be radiated by a single forward service link antenna feed element. In other embodiments, the forward service link message/channel that may be radiated by the space-based component, may be radiated by a plurality of forward service link antenna feed elements. In further embodiments, some forward service link message/channels that may be radiated by the space-based component, may be radiated by a single forward service link antenna feed element and some forward service link message/channels that may be radiated by the space-based component, may be radiated by a plurality of forward service link antenna feed elements.

In some embodiments, a plurality of return-link receivers may be configured to process a respective plurality of signal sets provided by the return service link antenna feed elements of the space-based component of the space-based network. In some embodiments, a signal set provided to a respective return-link receiver comprises a set of return service link antenna feed element signals associated with the predetermined return service link frequency or frequencies and the set of return service link antenna feed element signals are associated with a set of physically proximate and/or adjacent return service link antenna feed elements. In some embodiments, at least two different signal sets, provided to two different return-link receivers, comprise at least one common return service link antenna feed element signal. In some embodiments, the number of return-link receivers is equal to the number of return service link antenna feed elements and each return-link receiver may be configured to process a plurality of return service link antenna feed element signals associated with a respective plurality of return service link antenna feed elements that are configured physically proximate and/or adjacent at the space-based component. In other embodiments, each return-link receiver may be configured to process a single return service link antenna feed element signal. In further embodiments, some return-link receivers may be configured to process a plurality of return service link antenna feed element signals and some return-link receivers may be configured to process a single return service link antenna feed element signal.

Responsive to a return-link receiver detecting an identification message of a radioterminal, such as, for example, an identification message of a radioterminal requesting establishment of a communications channel between the radioterminal and a destination terminal, the space-based network may allocate forward- and/or return-link radio resources to the radioterminal to thereby allow the radioterminal to establish the communications channel and communicate. The radioterminal may be informed of the radio resources allocated by the network to the radioterminal by receiving information from the network via a forward-link channel. Using the return-link radio resource(s), the radioterminal may send information (communications waveforms) to the destination terminal, via the space-based network, and the destination terminal, via the space-based network, may send information (communications waveforms) to the radioterminal using the forward-link radio resource(s). The space-based network may be configured to receive and process information (communications waveforms) from the radioterminal using space-based and/or ground-based receivers/processors comprising the embodiments of FIG. 2 and/or FIG. 3 or elements of the embodiments of FIG. 2 and/or FIG. 3, as discussed above, to thereby allow optimum or near optimum non-satellite-based return-link beam forming (i.e., ground-based beam forming) without requiring that the plurality (N) of return service link antenna feed element signals be transported to a receiver, such as, for example, the receiver of FIG. 2 coherently, thereby simplifying return-link processing requirements, complexity and/or cost while maintaining optimum or near optimum performance. As such, frequency division multiplexing may be used to transport from the space-based component to a satellite-based or non-satellite-based beam forming receiver a plurality of waveforms corresponding to a respective plurality of return service link antenna feed elements. Other multiplexing techniques, such as, for example, time division multiplexing and/or code division multiplexing may also be used in some embodiments.

Regarding the utilization of the forward-link radio resources allocated by the space-based network in order to enable communications from the destination terminal to the radioterminal, the space-based network may, in accordance with some embodiments, send one or more communications waveforms to the space-based component of the space-based network (i.e., to a satellite) to be radiated by the space-based component using the allocated forward-link radio resources over a geographic area that includes the radioterminal. In some embodiments, the one or more communications waveforms that are sent to the space-based component comprise a plurality of communications waveforms that are substantially similar in information content and may differ by one or more complex values (constants). In such embodiments, one of the communications waveforms of the plurality of communications waveforms, that has a maximum amplitude relative to the other communications waveforms, is radiated by the space-based component using a forward service link antenna feed element associated with a geographic area containing the radioterminal, while the other communications waveforms of the plurality of communications waveforms are radiated by other proximate and/or adjacent forward service link antenna feed elements associated with geographic areas that do not include the radioterminal.

In further embodiments of the invention, the radioterminal receives from the space-based component a waveform that contains information that is a priori known to the radioterminal, such as, for example, information included in a preamble, mid-amble, a pilot channel, etc. In some embodiments, the a priori known information may be used by the radioterminal to derive an error measure at the radioterminal between a waveform state that is being received by the radioterminal and an ideal waveform state that may be received by the radioterminal in the absence of all channel/system impairments. In accordance with these embodiments, the radioterminal may transmit a measure of the error measure to the space-based network and the space-based network may use the measure of the error measure to modify a forward-link characteristic, such as, for example, a forward service link antenna pattern to thereby provide a reduced error measure at the radioterminal. The forward service link antenna pattern may be modified by modifying one or more of the complex values stated earlier. Other radioterminals that may be operating substantially co-channel and/or co-frequency with the radioterminal may experience an error measure increase due to the operation of the radioterminal. As such, in some embodiments, the measure of the error measure of one or more other co-channel and/or co-frequency radioterminals that is transmitted to the space-based network by the one or more other co-channel and/or co-frequency radioterminals may be combined at the space-based network with the measure of the error measure that is transmitted to the space-based network by the radioterminal to form an aggregate measure of error measure. The aggregate measure of error measure may be used by the space-based network to modify the forward service link antenna pattern of the radioterminal and/or the forward service link antenna pattern(s) of the one or more other co-channel and/or co-frequency radioterminals to minimize an aggregate error measure associated with the aggregate measure of error measure. It will be understood that the combining by the space-based network of a plurality of measures of error measure received from a respective plurality of co-channel and/or co-frequency radioterminals to form an aggregate measure of error measure, the space-based network may weigh different measures of error measure corresponding to different radioterminals substantially the same or differently prior to the combining.

As stated earlier, in some embodiments, the one or more communications waveforms that are sent to the space-based component in order to establish a forward service link antenna pattern for a radioterminal comprise a plurality of communications waveforms that are substantially similar in information content and may differ by one or more complex values. The one or more complex values may be substantially constant or quasi-constant over a period of time, but may change responsive to one or more changes in a forward-link which may, in general, cause a change in an aggregate measure of error measure thereby causing, in general, a change in at least one complex value of at least one waveform of the plurality of waveforms. It will be understood that an important advantage of the invention stems from the closed-loop nature with which forward service link antenna patterns are established without requiring coherency between the plurality of waveforms that are transported to the space-based component and used there to excite forward service link antenna feed elements to form a forward service link antenna pattern. As such, frequency division multiplexing may be used to transport to the space-based component the plurality of waveforms to be used at the space-based component to excite respective forward service link antenna feed elements. Other multiplexing techniques, such as, for example, time division multiplexing and/or code division multiplexing may also be used. Coherency is attained via usage of the measure(s) of the error measures by the space-based network, sent to the space-based network by one or more co-channel and/or co-frequency radioterminals, to derive the complex values (gains) associated with the plurality of communications waveforms that are sent to the space-based component to excite forward service link antenna feed elements of a satellite. The space-based network may iteratively derive the complex values (gains) that are associated with the plurality of communications waveforms that are sent to the space-based component to excite forward service link antenna feed elements of a satellite by correlating an aggregate measure of error measure with an appropriately stored (delayed) version of the plurality of waveforms sent to the space-based component.

In accordance with some embodiments, the space-based network may be configured to estimate a forward- and/or a return-link impact on one or more co-channel and/or co-frequency radioterminals of allocating additional co-channel and/or co-frequency forward- and/or return-link radio resources to one or more new radioterminals, before allocating the additional co-channel and/or co-frequency forward- and/or return-link radio resources to the new radioterminal(s). The space-based network may be configured to derive the estimate of the forward- and/or return-link impact by computer simulation/emulation and/or other means by using an estimate of the location(s) of the co-channel and/or co-frequency radioterminal(s) in conjunction with an estimate of the location(s) of the new radioterminal(s) and also using estimates relating to other system parameters, such as, for example, estimates of complex gains associated with the forward and/or return service link antenna feed elements of the space-based component. Based on the estimate of the forward- and/or return-link impact, the space-based network may be configured to allocate or deny the allocation of the co-channel and/or co-frequency radio resources to one, several or all of the new radioterminals.

Figure 5:
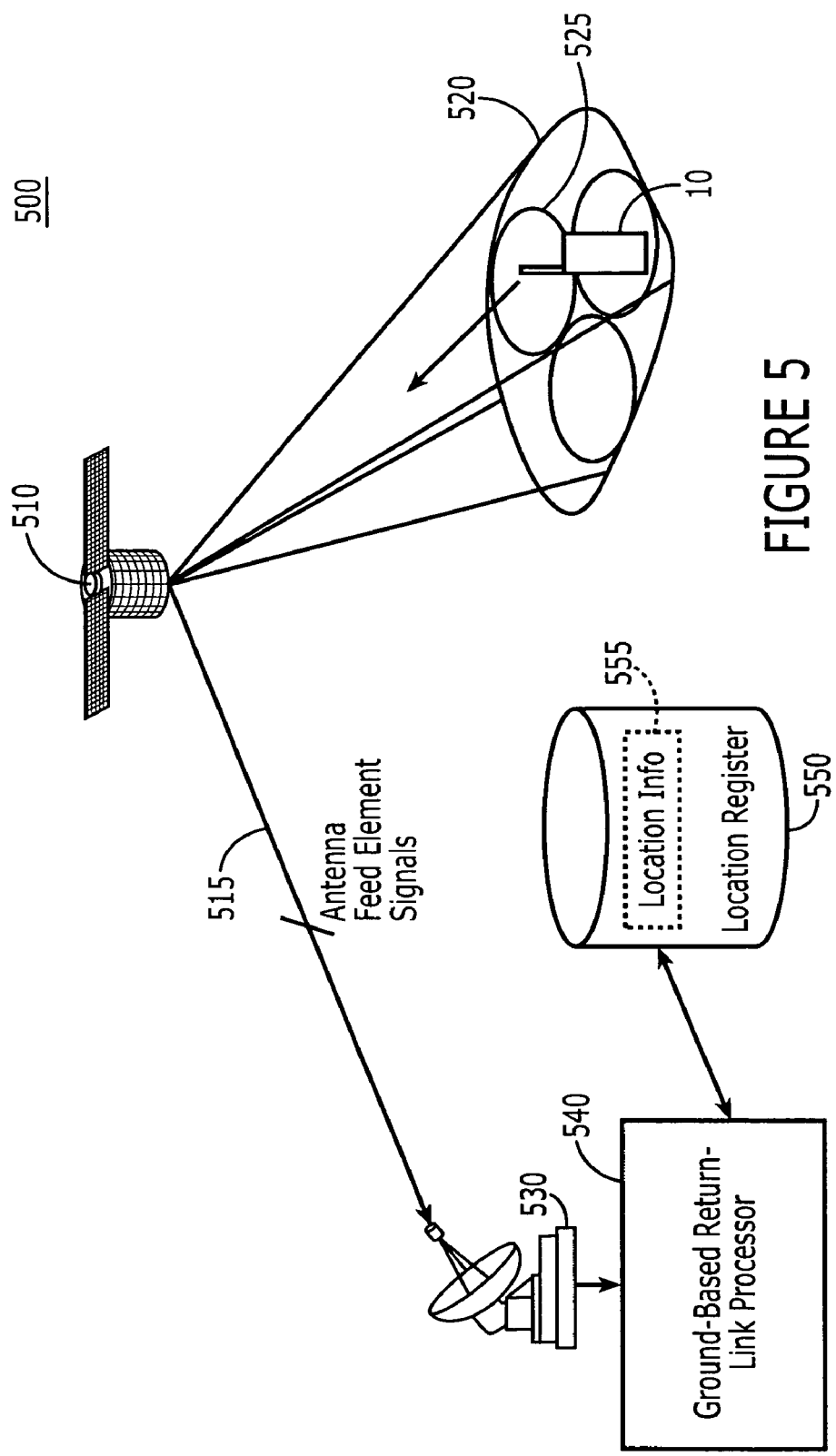
FIG. 5 is a schematic diagram illustrating a satellite communications system according to some embodiments of the present invention.

FIG. 5 illustrates a satellite communications system 500 according to further embodiments of the present invention. The system 500 includes a satellite 510 that serves a service region 520, here shown as including a plurality of cells (service link antenna patterns) 525. Responsive to radio transmissions from the service region 520, the satellite produces a plurality of return-link signals 515 that are provided to ground based equipment, here shown as including an antenna 530 and a ground-based return-link processor 540. The return-link signals 515 may be a plurality of antenna feed element signals that correspond to respective antenna beams (patterns) supported by an antenna on the satellite 510. It will be appreciated that, in general, each of the antenna beams may serve one or more of the cells 525 of the service region 520 and that the return-link signals 515 may correspond to signals from respective antenna feed elements and/or may be signals synthesized from combinations of signals from antenna feed elements. The return-link signals 515 may also be components of a composite signal, such as a feeder link signal synthesized using a technique such as that described above with reference to FIG. 3.

The ground-based return-link processor 540 is configured to select a subset of the return-link signals based on a location of a terminal 10 in the service region 520, and to detect a transmission from the radioterminal 10 from the selected subset of the plurality of return-link signals 515. For example, the ground-based return-link processor 540 may operate similarly to the return-link processor 200 of FIG. 2. As shown, the ground-based return-link processor 540 may be operatively associated with means for determining a location of the radioterminal 10, here shown as a location register 550. The location register 550 stores location information 555 for the radioterminal 10, which may be used in the signal selection process carrier out by the return-link processor 540. It will be appreciated that the location information 555 may include, for example, information relating to registration of the radioterminal 10 in a cell, beam and/or antenna pattern of the service region 520. For example, the radioterminal 10 may transmit a registration message via the satellite 510 and the return-link processor 540 and, responsive to the registration message, a mobile switching center (MSC) (not shown) or other infrastructure element may store location information associating the radioterminal 10 with one of the cells, beams and/or antenna patterns of the service region 520.

Figure 6:
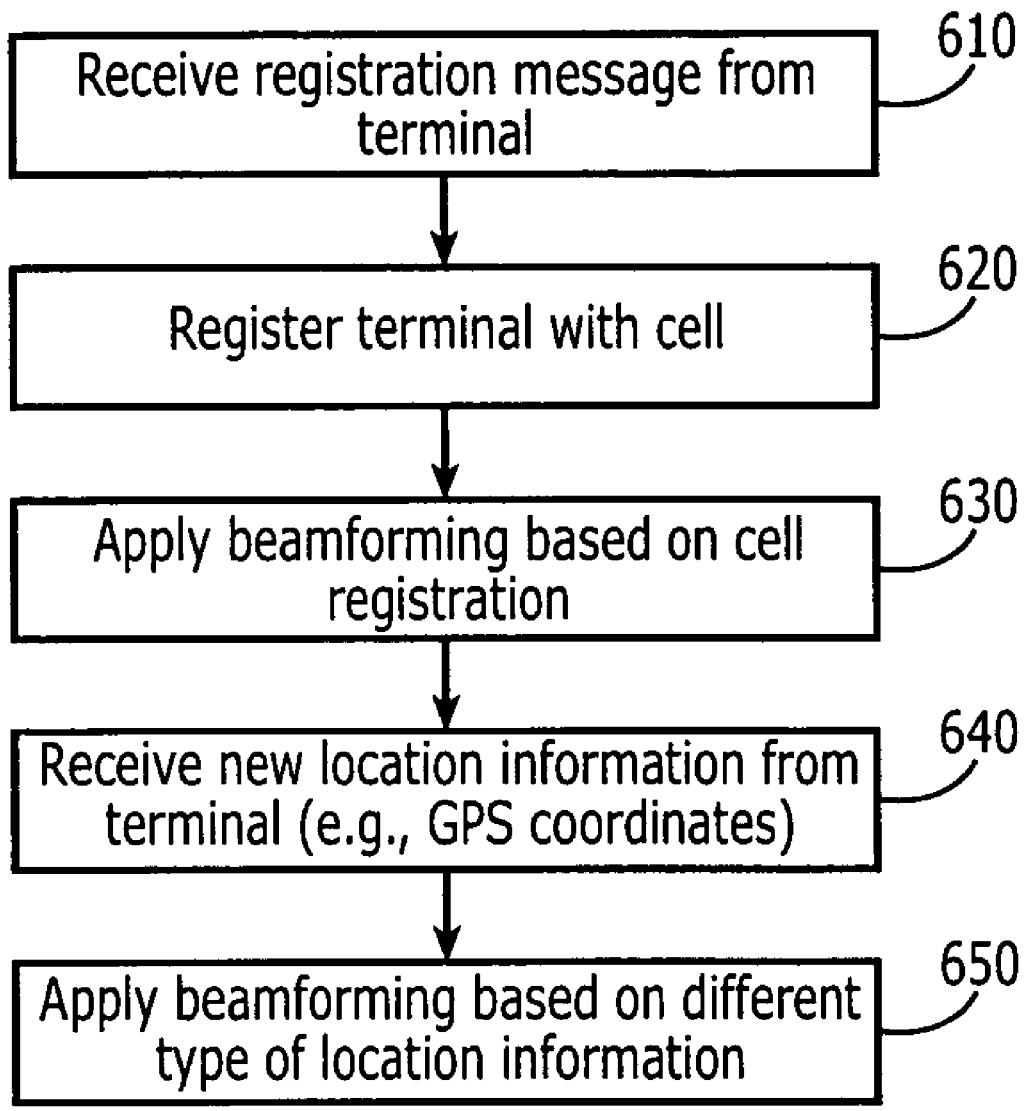
FIG. 6 is a flowchart illustrating exemplary operations in a satellite communications system according to further embodiments of the present invention.

According to further embodiments of the present invention, return-link processing may occur in multiple stages. For example, FIG. 6 illustrates exemplary operations in a satellite communications system, such as the system 500 of FIG. 5, that involve using progressively more precise and/or accurate location information to iteratively select return link signals. The system receives a registration message from a radioterminal (block 610). The system responsively registers the radioterminal with a cell, beam and/or antenna pattern of the service region of the system (block 620). A return-link processor, such as the return-link processor 540 of FIG. 5, is configured to select and process a subset of a plurality of return link signals based on the registration to recover transmissions from the terminal (block 630). Such recovered information may include information that is more precise, such as, for example, GPS data transmitted from the radioterminal (block 640). This new location information may be used to reconfigure the return-link processor to select and process a subset of the return-link signals based on the new location information (block 650).

Figure 7:
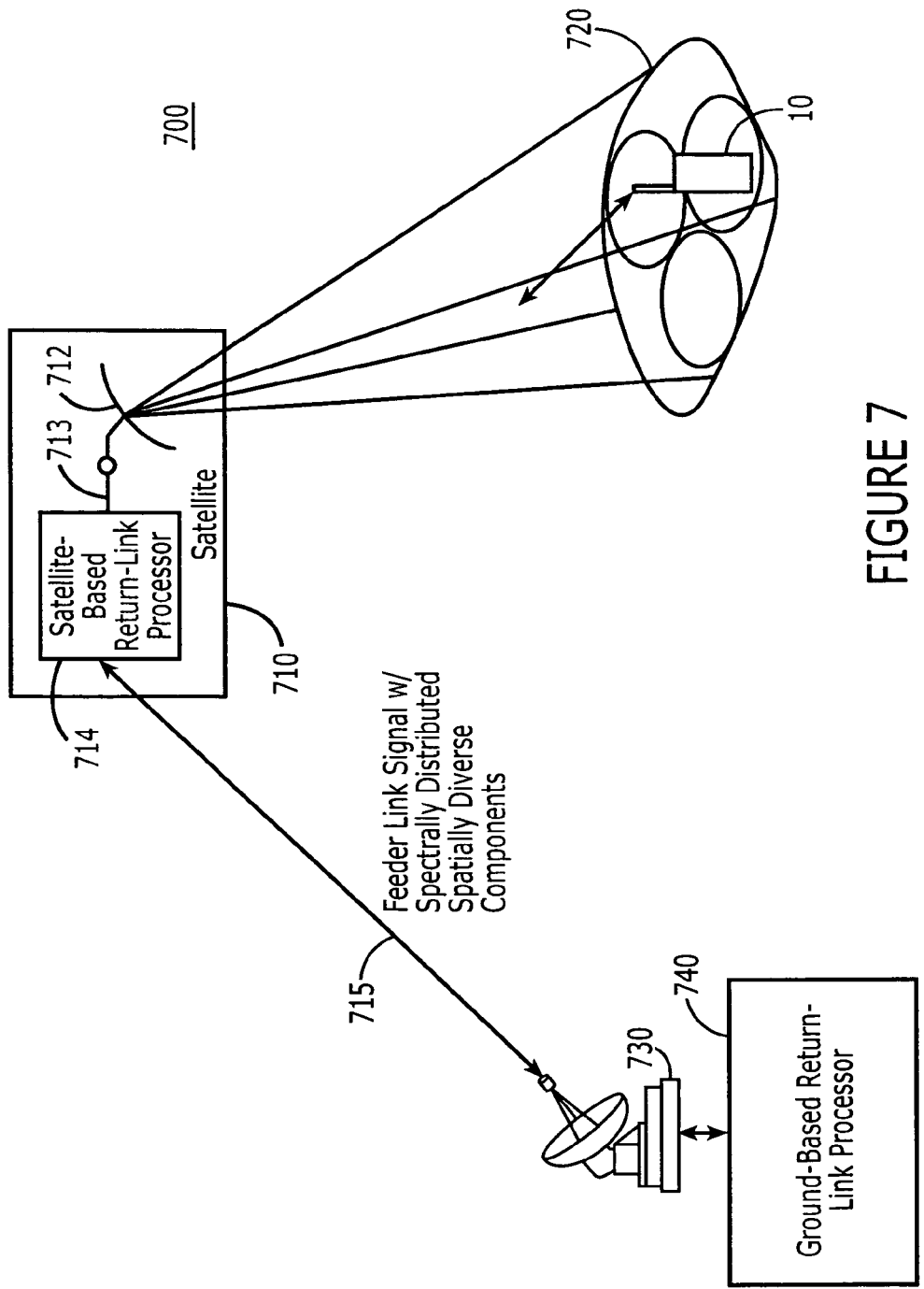
FIG. 7 is a schematic diagram illustrating a satellite communications system according to further embodiments of the present invention.

In further embodiments of the present invention, a ground-based return-link processor that selects and processes return link signals based on radioterminal location using techniques such as those described with reference to FIG. 2 may be combined with a satellite-based return-link processor that spectrally processes signals using techniques such as those described above with reference to FIG. 3. For example, referring to FIG. 7, a satellite communications system 700 includes a satellite 710 that serves a service region 720. Responsive to radio transmissions from the service region 720, an antenna 712 generates first return-link signals 713. Responsive to the first return-link signals 713, a satellite-based return-link processor 714 generates second return-link signals 715, which may, for example, be spectrally distributed components of a composite feeder link signal generated using techniques discussed above with reference to FIG. 3. The second return-link signals 715 are provided to a ground-based return-link processor 740 via an antenna 730. The ground-based return-link processor 740 is configured to select a subset of the second return-link signals based on a location of a terminal 10 in the service region 720, and to detect a transmission from the radioterminal 10 from the selected subset of the plurality of return-link signals 715. For example, the ground-based return-link processor 740 may operate similarly to the return-link processor 200 of FIG. 2.

Although in the above descriptions only one signal per return-link antenna feed element has been identified and processed, a return-link antenna feed element may provide two or more signals that may be derived from having configured the return-link antenna feed element to receive signals in two or more orthogonal dimensions of space and/or time. As used herein, a "return-link antenna feed element" represents a structure that is operatively configured to receive electromagnetic radiation in one or more space-time-frequency-phase dimensions and substantially maintain separate the received electromagnetic radiation corresponding to each one of the one or more orthogonal or substantially orthogonal space-time-frequency-phase dimensions and provide a measure of such received electromagnetic radiation at its output.

In some embodiments, a space based network, comprising at least one satellite, may be configured with forward service link ground-based beam forming in accordance with, for example, U.S. Pat. No. 5,903,549 to von der Embse et al., and with return service link ground-based beam forming means in accordance with embodiments of the present invention. In other embodiments, a space based network, comprising at least one satellite, may be configured with on-board satellite-based forward service link beam forming means, digital or analog, in accordance with, for example, the Thuraya or ACeS system, respectively, and with return service link ground-based beam forming means in accordance with embodiments of the present invention.

In yet other embodiments, a space based network, comprising at least one satellite with N1 return service link antenna feed elements and N2 forward service link antenna feed elements, where N1>N2, is configured with on-board satellite-based forward service link beam forming means, digital or analog, in accordance with, for example, the Thuraya or ACeS system, respectively, and with return service link ground-based beam forming means in accordance with embodiments of the present invention. In still other embodiments, a space based network, comprising at least one satellite with a return service link antenna of radius R1 and a forward service link antenna of radius R2, where R1>R2, is configured with on-board satellite-based forward service link beam forming means, digital or analog, in accordance with, for example, the Thuraya or ACeS system, respectively, and with return service link ground-based beam forming means in accordance with the present invention. Still other embodiments of the invention may be used on both the forward and return service links.

Finally, it will be understood that, although embodiments of the present invention have been described primarily with respect to satellite radioterminal systems, analogous method aspects also may be provided according to other embodiments of the invention. Moreover, separate ground-based processors, such as the ground-based return-link processor 200 of FIG. 2, separate satellite-based processors, such as the satellite-based return-link processor 300 of FIG. 3 and their associated methods of operation, also may be provided according to still other embodiments of the invention.

In the drawings and specification, there have been disclosed exemplary embodiments of the invention. Although specific terms are employed, they are used in a generic and descriptive sense only and not for purposes of limitation, the scope of the invention being defined by the following claims.

What is claimed is:

1. A processor for use in a satellite communications system, the processor comprising:
   a selector that is configured to select a subset of a plurality of signals that are received at a satellite; and
   a detector that is configured to detect a transmission of a terminal responsive to the selected subset of the plurality of signals;
   wherein the selector and the detector are positioned at a distance from the satellite and wherein the subset of the plurality of signals is selected by the selector responsive to a location of the terminal, and
   wherein the selector is configured to select a first subset of the plurality of signals responsive to a transmission of the terminal, wherein the detector is configured to associate location information with the terminal responsive to the first subset of the plurality of signals, wherein the selector is further configured to select a second subset of the plurality of signals responsive to the location information, and wherein the detector is further configured to detect a subsequent transmission of the terminal responsive to the second subset of the plurality of signals.

2. A processor according to claim 1, wherein the plurality of signals corresponds to a respective plurality of antenna elements of a service link antenna of the satellite.

3. A processor according to claim 1, wherein the selector and/or the detector is/are located at a gateway of the satellite.

4. A processor according to claim 1, wherein the selector is further configured to select the subset of the plurality of signals responsive to an association of the terminal with an antenna pattern of the satellite and/or a received signal strength due to a transmission of the terminal.

5. A processor according to claim 1, wherein the detector is operative to process a plurality of diverse signal sets that are included in the selected subset of the plurality of signals, and to detect the transmission of the terminal from processing of at least one of the plurality of diverse signal sets.

6. A processor according to claim 5, wherein the detector comprises a signal processor configured to detect the transmission of the terminal by adaptively processing at least one of the plurality of diverse signal sets;
   wherein adaptively processing comprises processing in accordance with a minimum mean-squared error performance index.

7. A satellite communications system comprising:
   a satellite configured to receive a plurality of spatially diverse signals from a radioterminal; and
   a processor configured to select a subset of the plurality of spatially diverse signals and to detect a transmission of the radioterminal responsive to the selected subset of the plurality of spatially diverse signals;
   wherein the processor is positioned at a distance from the satellite, the plurality of spatially diverse signals are received at the satellite via a respective plurality of antenna elements of the satellite and wherein the processor is configured to select the subset of the plurality of spatially diverse signals based upon a location of the radioterminal, and
   wherein the processor is configured to select a first subset of the plurality of spatially diverse signals responsive to a transmission of the radioterminal, to detect location information associated with the radioterminal responsive to the first subset of the plurality of spatially diverse signals, to select a second subset of the plurality of spatially diverse signals responsive to the detected location information, and to detect a subsequent transmission of the radioterminal responsive to the second subset of the plurality of spatially diverse signals.

8. A system according to claim 7, wherein the processor is configured to select the subset of the plurality of spatially diverse signals based upon an association of the radioterminal with an antenna pattern of the satellite over which a signal that is transmitted by the radioterminal is received at a maximum or near maximum strength.

9. A system according to claim 7, wherein the processor is configured to detect the transmission of the radioterminal by adaptively processing at least one signal of the plurality of spatially diverse signals;
   wherein adaptively processing comprises processing in accordance with a minimum mean-squared error performance index.

10. A system according to claim 7, wherein the processor is positioned at a gateway of the satellite.

11. A system according to claim 10, wherein the satellite comprises a processor configured to receive first signals from the plurality of antenna elements of the satellite and to responsively generate a feeder link signal including second signals, wherein the second signals correspond to selected frequency components of the first signals.

12. A system according to claim 7, wherein the processor is configured to further select the subset of the plurality of spatially diverse signals responsive to an association of the radioterminal with an antenna pattern of the satellite and/or a received signal strength due to a transmission of the radioterminal.

13. A system according to claim 7, wherein the processor is configured to process a plurality of signal sets and to detect the transmission of the radioterminal by processing at least one signal set of the plurality of signal sets; wherein the plurality of signal sets is derived from the selected subset of the plurality of spatially diverse signals.

14. A system according to claim 13, wherein the processor comprises:
   a selector configured to select the subset of the plurality of spatially diverse signals;
   a channelization and frequency translation unit configured to generate the plurality of signal sets from the selected subset of the plurality of spatially diverse signals; and
   a detector configured to detect the transmission of the radioterminal by adaptively processing at least one signal set of the plurality of signal sets.

15. A satellite communications system comprising:
   a satellite-based processor configured on a satellite to receive first spatially diverse signals from a satellite antenna and to responsively generate a feeder link signal, wherein the satellite-based processor discards at least one signal of the first spatially diverse signals and generates the feeder link signal by spectrally distributing second spatially diverse signals corresponding to selected frequency components of the first spatially diverse signals; and
   a signal processor configured to select a subset of the second spatially diverse signals based upon a location of a radioterminal and to detect a transmission of the radioterminal responsive to the selected subset of the second spatially diverse signals, and
   wherein the signal processor is configured to select a first subset of the second spatially diverse signals responsive to a transmission of the radioterminal, to associate location information with the radioterminal responsive to the first subset of the second spatially diverse signals, to select a second subset of the second spatially diverse signals responsive to the location information, and to detect a subsequent transmission of the radioterminal responsive to the second subset of the second spatially diverse signals;

wherein the signal processor is positioned at a distance from the satellite.

16. A system according to claim 15, further comprising the satellite antenna that generates the first spatially diverse signals.

17. A system according to claim 16, wherein respective ones of the first spatially diverse signals comprise signals corresponding to respective elements of the satellite antenna.

18. A system according to claim 15, wherein the signal processor is configured to further select the subset of the second spatially diverse signals responsive to an association of the radioterminal with an antenna pattern of the satellite and/or a received signal strength due to a transmission of the radioterminal.

19. A system according to claim 15, wherein the signal processor is operative to process a plurality of signal sets and to detect the transmission of the radioterminal by processing at least one signal set of the plurality of signal sets; wherein the plurality of signal sets is derived from the selected subset of the second spatially diverse signals.

20. A system according to claim 19, wherein the signal processor comprises:
a selector configured to select the subset of the second spatially diverse signals;
a channelization and frequency translation unit configured to generate the plurality of signal sets from the selected subset of the second spatially diverse signals; and
a detector configured to detect the transmission of the radioterminal by adaptively processing at least one signal set of the plurality of signal sets.

21. A satellite communications method comprising:
generating at a satellite a plurality of spatially diverse signals based upon a transmission of a radioterminal;
selecting a subset of the plurality of spatially diverse signals based upon a location of the radioterminal; and
detecting a transmission of the radioterminal responsive to the selected subset of the spatially diverse signals
wherein selecting a subset of the plurality of spatially diverse signals based upon a location of a radioterminal comprises selecting a first subset of the plurality of spatially diverse signals responsive to a transmission of a radioterminal;
wherein detecting a transmission of the radioterminal responsive to the selected subset of the spatially diverse signals comprises detecting location information associated with the radioterminal responsive to the first subset of the plurality of spatially diverse signals;
wherein selecting a subset of the plurality of spatially diverse signals based upon a location of a radioterminal further comprises selecting a second subset of the plurality of spatially diverse signals responsive to the detected location information; and wherein detecting a transmission of the radioterminal responsive to the selected subset of the spatially diverse signals further comprises detecting a subsequent transmission of the radioterminal responsive to the second subset of the plurality of spatially diverse signals;

wherein the selecting and detecting are performed at a distance from the satellite.

22. A method according to claim 21, wherein respective ones of the plurality of spatially diverse signals comprise signals corresponding to respective elements of an antenna of the satellite.

23. A method according to claim 21, wherein selecting a subset of the plurality of spatially diverse signals based upon a location of a radioterminal is preceded by transmitting the plurality of spatially diverse signals from the satellite to a satellite gateway.

24. A method according to claim 21, wherein generating at a satellite a plurality of spatially diverse signals based upon a transmission of a radioterminal comprises:
generating first spatially diverse signals from a satellite antenna; and
generating a feeder link signal including second spatially diverse signals responsive to the first spatially diverse signals, including spectrally distributing the second spatially diverse signals in the feeder link signal;
wherein selecting a subset of the plurality of spatially diverse signals based upon a location of a radioterminal comprises selecting a subset of the second spatially diverse signals based upon the location of a radioterminal; and
wherein detecting a transmission of the radioterminal responsive to the selected subset of the spatially diverse signals comprises detecting a transmission of the radioterminal responsive to the selected subset of the second spatially diverse signals.

25. A method according to claim 21, wherein selecting a subset of the plurality of spatially diverse signals based upon a location of a radioterminal comprises further selecting the subset of the plurality of spatially diverse signals based on an association of a radioterminal with an antenna pattern of the satellite and/or a received signal strength due to a transmission of a radioterminal.

26. A method according to claim 21, wherein detecting a transmission of the radioterminal responsive to the selected subset of the spatially diverse signals comprises:
generating a plurality of signal sets from the selected subset of spatially diverse signals; and
detecting a transmission of the radioterminal by adaptively processing at least one signal set of the plurality of signal sets.

* * * * *

UNITED STATES PATENT AND TRADEMARK OFFICE
CERTIFICATE OF CORRECTION

PATENT NO. : 8,265,549 B2  
APPLICATION NO. : 11/126799  
DATED : September 11, 2012  
INVENTOR(S) : Karabinis et al.

Page 1 of 2

It is certified that error appears in the above-identified patent and that said Letters Patent is hereby corrected as shown below:

On the Title Page:
Item (54) and in the Specification, Column 1, Line 1, Title:
Please correct "SATELLITE COMMUNICATIONS SYSTEMS AND METHODS USING RADIOTELEPHONE"

to read -- SATELLITE COMMUNICATIONS SYSTEMS AND METHODS USING RADIOTELEPHONE LOCATION-BASED BEAMFORMING --

In the Claims:
Column 23, Line 35 through Column 24, Line 9, Claim 21: Please replace Claim 21 in its entirety with the following:

-- A satellite communications method comprising:
  generating at a satellite a plurality of spatially diverse signals based upon a transmission of the radioterminal;
  selecting a subset of the plurality of spatially diverse signals based upon a location of the radio terminal; and
  detecting a transmission of the radioterminal responsive to the selected subset of the spatially diverse signals;
  wherein the selecting and detecting are performed at a distance from the satellite;
  wherein selecting a subset of the plurality of spatially diverse signals based upon a location of a radioterminal comprises selecting a first subset of the plurality of spatially diverse signals responsive to a transmission of a radioterminal;
  wherein detecting a transmission of the radioterminal responsive to the selected subset of the spatially diverse signals comprises detecting location Signed and Sealed this  
Third Day of June, 2014

Michelle K. Lee  
*Deputy Director of the United States Patent and Trademark Office*

CERTIFICATE OF CORRECTION (continued)
U.S. Pat. No. 8,265,549 B2 information associated with the radio terminal responsive to the first subset of the plurality of spatially diverse signals;

wherein selecting a subset of the plurality of spatially diverse signals based upon a location of a radioterminal further comprises selecting a second subset of the plurality of spatially diverse signals responsive to the detected location information; and wherein detecting a transmission of the radioterminal responsive to the selected subset of the spatially diverse signals further comprises detecting a subsequent transmission of the radioterminal responsive to the second subset of the plurality of spatially diverse signals. --